United States Patent [19]

Müller et al.

[11] 4,327,823
[45] May 4, 1982

[54] CLUTCH RELEASE DEVICE

[75] Inventors: Leo Müller, Essleben; Walter Köder, Schweinfurt, both of Fed. Rep. of Germany

[73] Assignee: SKF Kugellagerfabriken GmbH, Schweinfurt, Fed. Rep. of Germany

[21] Appl. No.: 148,375

[22] Filed: May 9, 1980

[30] Foreign Application Priority Data

May 11, 1979 [DE] Fed. Rep. of Germany ... 7913673[U]

[51] Int. Cl.³ .............................................. F16D 23/14
[52] U.S. Cl. .................................. 192/98; 192/110 B
[58] Field of Search ................... 192/98, 110 B, 99 A, 192/89 B

[56] References Cited

U.S. PATENT DOCUMENTS 3,913,714  10/1975  Camp ................................. 192/98 X
3,967,710   7/1976  Shifter .............................. 192/110 B
3,985,215  10/1976  Ernst et al. ........................... 192/98

*Primary Examiner*—George H. Krizmanich
*Attorney, Agent, or Firm*—Daniel M. Rosen

[57] ABSTRACT

In a clutch release bearing, wherein a pressure plate is affixed to a sliding sleeve, the pressure plate has a cylindrical portion affixed to the sleeve, a radial flange adapted to abut the bearing of the device, and an intermediate conical section. The conical section has four recesses distributed thereabout, two of which are adapted to engage projections of a clutch lever. A holding ring is held on the cylindrical portion of the pressure plate, and has projections entering the other two recesses of the pressure plate. Recesses in the holding ring aligned with the first mentioned recesses have tongues adapted to resiliently hold the projections of the clutch lever in the respective recesses.

4 Claims, 6 Drawing Figures

CLUTCH RELEASE DEVICE

This invention relates to a clutch release device especially for automotive vehicles. This type of release device is comprised of an anti-friction bearing mounted on a sliding sleeve. The fixed bearing-ring abuts a pressure plate or similar element, and is secured in an axial direction as well as against turning. The clutch lever of the release device is detachably held to the pressrue plate by suitable connecting elements.

German Patent DE-OS No. 2,005,892 discloses a clutch release device in which the clutch lever is detachably affixed to a housing by a spring element formed integrally with a sheet-metal support fastened to the housing.

This arrangement has the disadvantage that the supporting element is a relatively complicated structural part, and the connection of the clutch release to the clutch lever is very complicated. In addition, the holding spring can easily break in the presence of strong vibration.

DE-GM No. 7,821,321 discloses the attachment of the clutch release device to the clutch lever by a holding component in the form of a circular band. The band engages two receivers in openings of the sliding sleeve. This arrangement, however, is relatively expensive. A further clutch release device of the above type is disclosed in copending U.S. Pat. application Ser. No. 126,437, Olschewski et al., assigned to the assignee of the present invention.

The invention is therefore directed to the provision of a release device for clutches of the above type, wherein the clutch lever is attached to the clutch release device by a simply shaped element that can be inexpensively produced by injection molding or casting; can be easily fastened to the pressure plate or the like and which permits repeated mounting and dismounting of the clutch release device.

A relatively secure connection between the clutch lever and the clutch release device is obtained by the use of the holding ring of the invention, since the holding ring is not under load after the clutch lever has been snapped in place.

In order that the invention will be more clearly understood, it will now be disclosed in greater detail with reference to the accompanying drawings, wherein.

Figure 1:
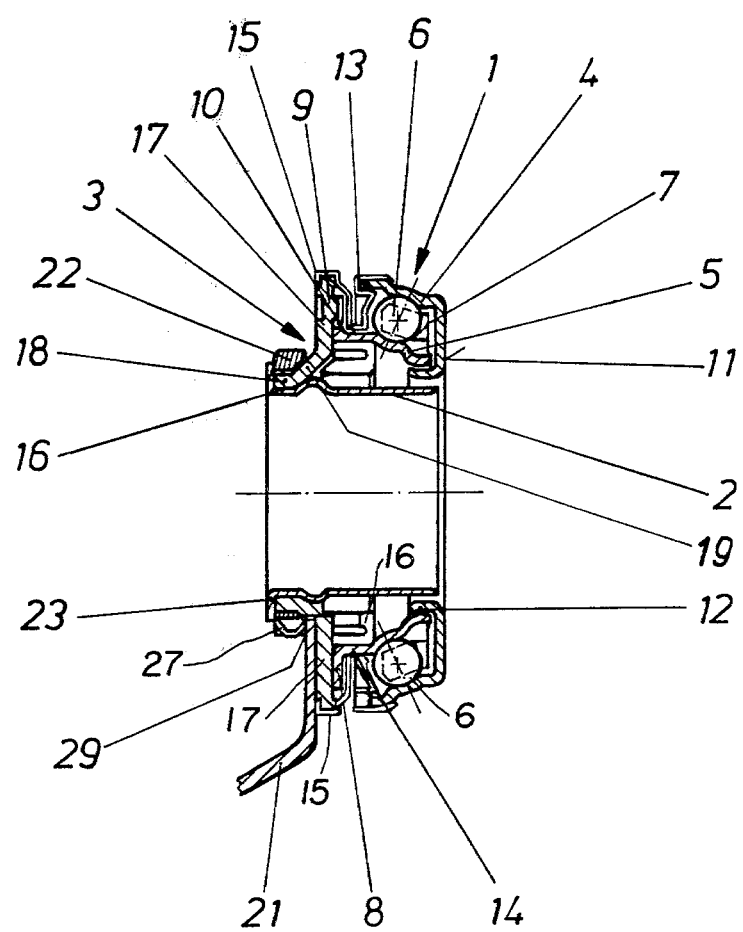
FIG. 1 is a cross-sectional view of a clutch release according to the invention.
Figure 2:
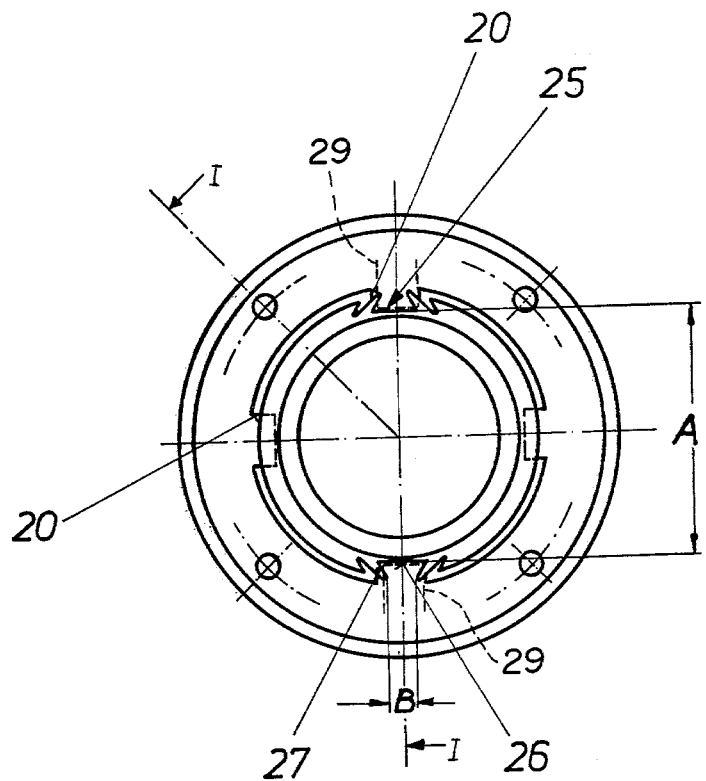
FIG. 2 is a side view of the clutch release device of FIG. 1.
Figure 3:
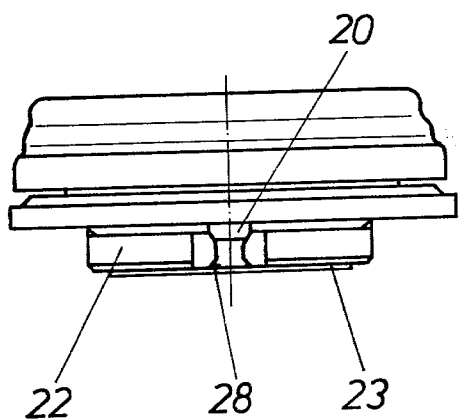
FIG. 3 is a top view of the clutch release device of FIG. 1.

FIGS. 1 to 3 show a clutch release device comprising a clutch thrust bearing 1, a sliding sleeve 2 and a pressure plate 3 having a cylindrical end portion connected to sliding sleeve 2. Clutch thrust bearing 1 includes sheet-metal bearing rings 4 and 5 and balls 6, arranged in a plastic cage 7. The fixed bearing-ring 5 of clutch thrust bearing 1 abuts radially extending flange 17 of pressure plate 3 with radially outwardly oriented flange 8, and is radially movable with respect to the pressure plate. Pressure plate 3 is provided with several axially aligned projections 9, that are distributed around the periphery. The projections extend into recesses 10 in flange 8 of the fixed bearing-ring 5, and prevent relative circumferential movement of the bearing ring. The outer ring 4 has a radially directed surface 11 adpated to abut the diaphragm spring (not shown) of the clutch. The sealing of clutch thrust-bearing 1 is accomplished, on the side facing the clutch, by sealing slot 12 formed between axially directed sections of inner ring 5 and outer ring 4. The other side of the clutch thrust-bearing 1 is sealed by a sheet-metal cap 13 which extends all the way to a slot on cylindrical surface 14 of inner ring 5. The clutch thrust-bearing 1 is axially held to pressure plate 3 by a sheet-metal cap 15. The cap 15 is attached to the peripheral edge of pressure plate 3 and extends behind flange 8 of the fixed bearing ring 5. A ring 16 is positioned in the bore of the fixed bearing ring 5. The ring 16 has a U-shaped cross-section, and is made of an elastic material. This ring attenuates major radial motions of clutch thrust bearing 1, such as occur during strong road shocks.

Figure 4:
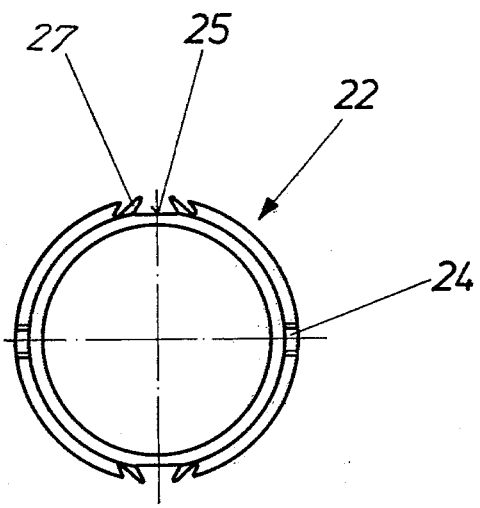
FIG. 4 is an end view of holding ring for affixing the clutch lever to the clutch release device of FIG. 1.
Figure 5:
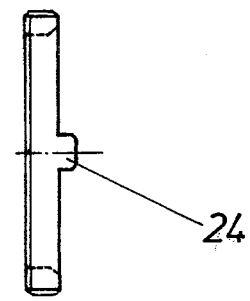
FIG. 5 is a side view of the holding ring of FIG. 4.
Figure 6:
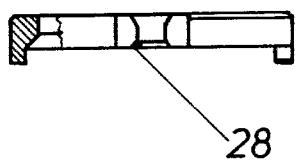
FIG. 6 is the top view of the holding ring of FIG. 4.

Pressure plate 3 has a conical section 19 between radially extending flange 17 and the cylindrical section 18 mounted on the sliding sleeve. The conical section 19 has recesses 20 cut out therefrom. There may, for example, be four of these recesses, and they are distributed around the periphery of the conical section. The clutch lever 21 has a pair of projections 29 which engage two diametrically opposite recesses 20. The clutch lever is removably attached to the clutch release, in the axial direction, by a plastic holding ring 22. The holding ring 22, shown separately in FIGS. 4 to 6, is positioned on the axially extending section 18 of pressure plate 3, and may be axially held, for example by a radially outwardly bent edge 23 of sliding sleeve 2. The holding ring 22 is held against turning by two axially extending projections 24 (FIGS. 4 and 5) formed on the holding ring. These projections engage two recesses 20 of pressure plate 3 that do not engage the projections 29 of the clutch lever. Holding ring 22 has two diametrically opposite axially extending grooves 25 on its cylindrical periphery. These grooves are positioned in front of the recesses 20 of pressure plate 3 that engage the projections 29 of the clutch lever. The diametral distance A between the bottom surfaces 26 of the two grooves 25 is equal to the distance between the two opposite radially bottom surfaces of the respective recesses 20. The width of the grooves 25 is greater than the width of the respective recesses 20 in the pressure plate 3. Each groove 25 has two converging tongues 27 formed thereon. The tongues are resilient and have chamfers 28 at their free ends. The tongues extend outwardly from the bottom of the respective grooves 25, as shown in FIG. 4, and the chamfers 28 are at the axially opposite edges of the tongues, as shown in FIG. 6. The distance B between the tongues 27 is smaller than the width of the projections 29 on the clutch lever 21, as shown symbolically in dashed lines in FIG. 2, so that when the clutch lever 21 is urged toward the grooves 25, the projections 29 engage the chamfers 28 and the tongues 27 are forced to angle in an outward direction to enable the projections 29 of lever 21 to be inserted between the tongues and thence into the recesses 20 of pressure plate 3.

After the insertion of clutch lever 21 into recesses 20 of pressure plate 3, the resilient tongues 27 spring back to their initial position, and thereby hold lever 21 to the clutch release device. During disassembly of clutch lever 21, the elastic tongues 27 are pushed apart by urging the projections 29 of release clutch-lever 21 away from the clutch release device.

While the invention has been disclosed with reference to a single embodiment, it will be apparent that variations and modifications may be made therein. It is therefore intended in the following claims to cover each such variation and modification as follows within the spirit and scope of the invention.

What is claimed is:

1. In a clutch release device wherein an antifriction bearing is positioned on a sliding sleeve and has a fixed bearing ring abutting pressure plate means, the fixed bearing ring being held axially as well as rotationally with respect to the pressure plate means, and wherein a clutch release lever is adapted to be releasably fastened to the pressure plate means by connecting means; the improvement wherein said connecting means comprises a holding ring positioned on an axially extending section of said pressure plate means said holding ring having a cylindrical surface with two diametrically opposite axially extending grooves, said pressure plate having a pair of recesses in said axially extending section for receiving projections of said clutch release lever, said grooves being positioned in front of said recesses of said pressure plate means, each of said grooves having two convergent resilient tongues formed thereon and extending from the base surface of the respective groove, the distance between the tongues being smaller than the width of the projections of said clutch lever.

2. The clutch release device of claim 1, wherein said tongues have chamfers at their free ends.

3. The clutch release device of claim 1 wherein the holding ring has at least one axially aligned projection on the side facing the pressure plate means, said last mentioned projection engaging recess means in said pressure plate means.

4. In a clutch release device having a pressure plate with a pair of diametrically opposite recesses adapted to receive a pair of projections of a clutch lever, and means for releasably holding said projections in the axial direction in said recesses; the improvement wherein said holding means comprises a ring fixedly mounted with respect to said pressure plate, said ring having a pair of diametrically opposite axially extending grooves in its circumferential surface and aligned with said recesses, the bottoms and sides of said grooves being dimensioned to enable free axial movement of said clutch lever projections to and from said recesses, and resilient tongue means extending from said ring into alignment with said grooves, whereby said tongues resiliently restrain axial movement of said clutch lever projections into and out of said recesses.

* * * * *